United States Patent
Boske

(10) Patent No.: US 10,035,197 B2
(45) Date of Patent: Jul. 31, 2018

(54) QUICK CHANGE SYSTEM FOR ROTARY TOOLS

(71) Applicant: Boorwerk B.V., Weesp (NL)

(72) Inventor: Richard Alexander Boske, Bussum (NL)

(73) Assignee: BOORWERK B.V., Almere (NL)

( * ) Notice: Subject to any disclaimer, the term of this patent is extended or adjusted under 35 U.S.C. 154(b) by 0 days.

(21) Appl. No.: 14/888,640

(22) PCT Filed: May 5, 2014

(86) PCT No.: PCT/NL2014/050288
§ 371 (c)(1),
(2) Date: Nov. 2, 2015

(87) PCT Pub. No.: WO2014/178718
PCT Pub. Date: Nov. 6, 2014

(65) Prior Publication Data
US 2016/0067794 A1    Mar. 10, 2016

(30) Foreign Application Priority Data

May 3, 2013    (NL) .................................. 1040196

(51) Int. Cl.
*B23B 51/04* (2006.01)
(52) U.S. Cl.
CPC ...... *B23B 51/0473* (2013.01); *B23B 51/0426* (2013.01); *B23B 51/0453* (2013.01); *B23B 2231/0204* (2013.01); *B23B 2231/04* (2013.01); *B23B 2251/02* (2013.01)

(58) Field of Classification Search
CPC ........ B23B 51/0473; B23B 2231/0204; B23B 2231/04; B23B 2251/02; B23B 2251/603
See application file for complete search history.

(56) References Cited

U.S. PATENT DOCUMENTS

| 4,687,367 A | 8/1987 | Bondioli |
| 4,818,157 A | 4/1989 | Kouvelis |
| 4,927,286 A | 5/1990 | Hobluigie et al. |
| 6,079,716 A | 6/2000 | Harman, Jr. et al. |

(Continued)

FOREIGN PATENT DOCUMENTS

| DE | 20008905 U1 | 8/2000 |
| DE | 202007001457 U1 | 5/2007 |

(Continued)

OTHER PUBLICATIONS

International Search Report PCT/ISA/210 for International Application No. PCT/NL2014/050288 dated Jul. 24, 2014.

(Continued)

*Primary Examiner* — Alan Snyder
(74) *Attorney, Agent, or Firm* — Harness, Dickey & Pierce, P.L.C.

(57) ABSTRACT

A quick change system for rotary tools is disclosed, particularly hole saws. The system includes an elongate shank and a tool adapter for coupling a rotary tool to the shank. The quick change system includes a rotation blocking, a first axial blocking which can be operated and a second axial blocking which cannot be operated. A shank and a tool adapter for the purpose of forming a quick change system for rotary tools are also disclosed.

19 Claims, 7 Drawing Sheets

(56) References Cited

U.S. PATENT DOCUMENTS

| | | | |
|---|---|---|---|
| 6,293,559 B1 | 9/2001 | Harman, Jr. et al. | |
| 7,824,137 B2 * | 11/2010 | Vasudeva | B23B 31/008 |
| | | | 206/379 |
| 7,934,893 B2 * | 5/2011 | Gillissen | B23B 31/107 |
| | | | 279/77 |
| 2004/0146366 A1 | 7/2004 | Holcomb | |
| 2004/0161313 A1 | 8/2004 | Nordlin | |
| 2009/0252567 A1 | 10/2009 | Gillissen | |
| 2010/0008739 A1 | 1/2010 | Chiang | |

FOREIGN PATENT DOCUMENTS

| | | | | |
|---|---|---|---|---|
| EP | 0201464 A1 | | 11/1986 | |
| FR | 1103112 A | | 10/1955 | |
| GB | 2307930 A | * | 6/1997 | ......... B23B 51/0473 |
| JP | 36-28170 | | 10/1961 | |
| JP | 10-277824 A | | 10/1998 | |
| NL | 2003834 C | | 5/2011 | |
| WO | WO-2004/011179 A1 | | 2/2004 | |
| WO | WO-2006062388 A1 | | 6/2006 | |
| WO | WO-2010112250 A1 | | 10/2010 | |

OTHER PUBLICATIONS

Written Opinion of the International Searching Authority PCT/ISA/237 for International Application No. PCT/NL2014/050288 dated Jul. 24, 2014.
Written Opinion dated Apr. 21, 2015.
Japanese Office Action and English translation thereof dated May 16, 2017.

* cited by examiner

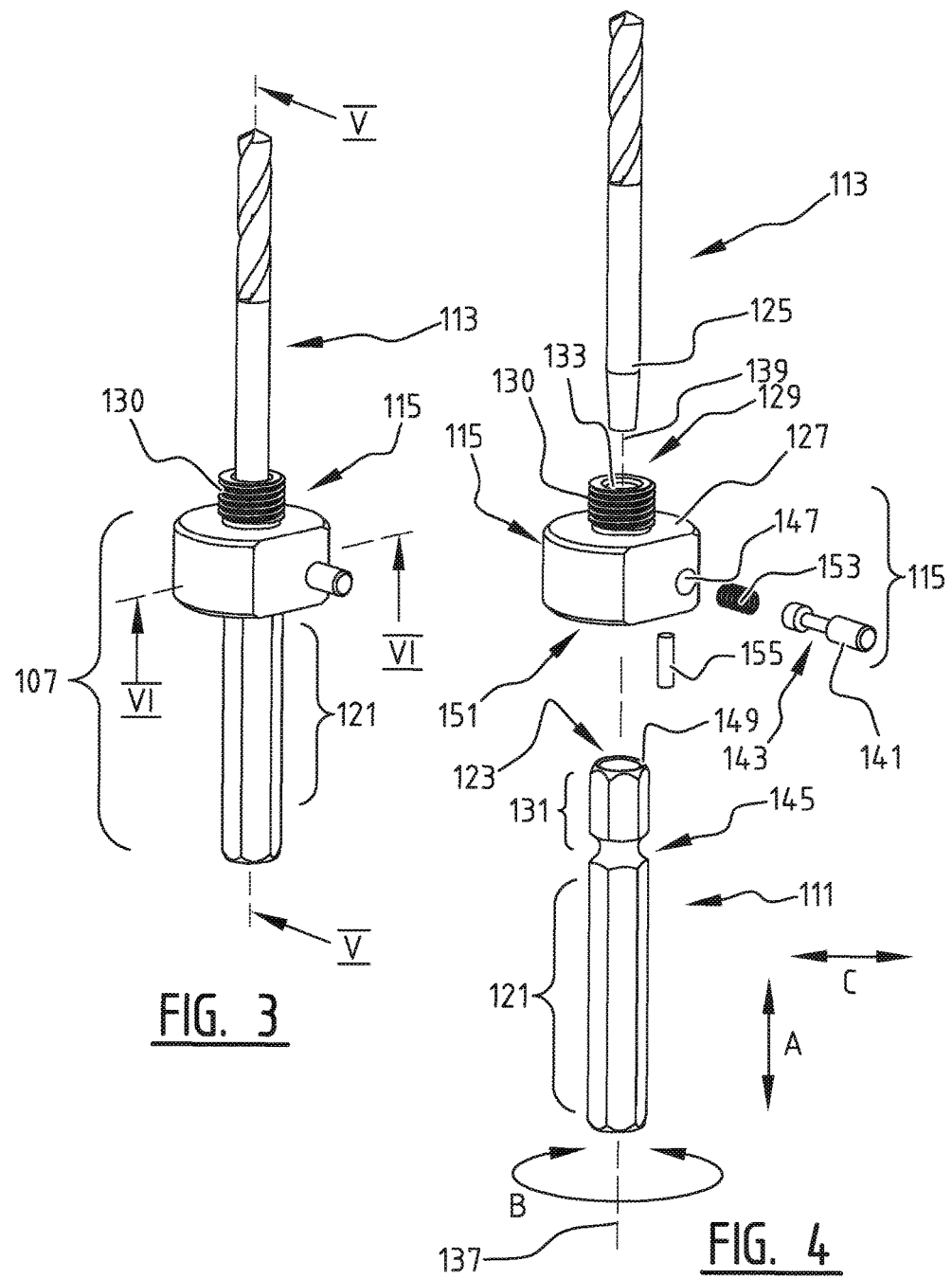

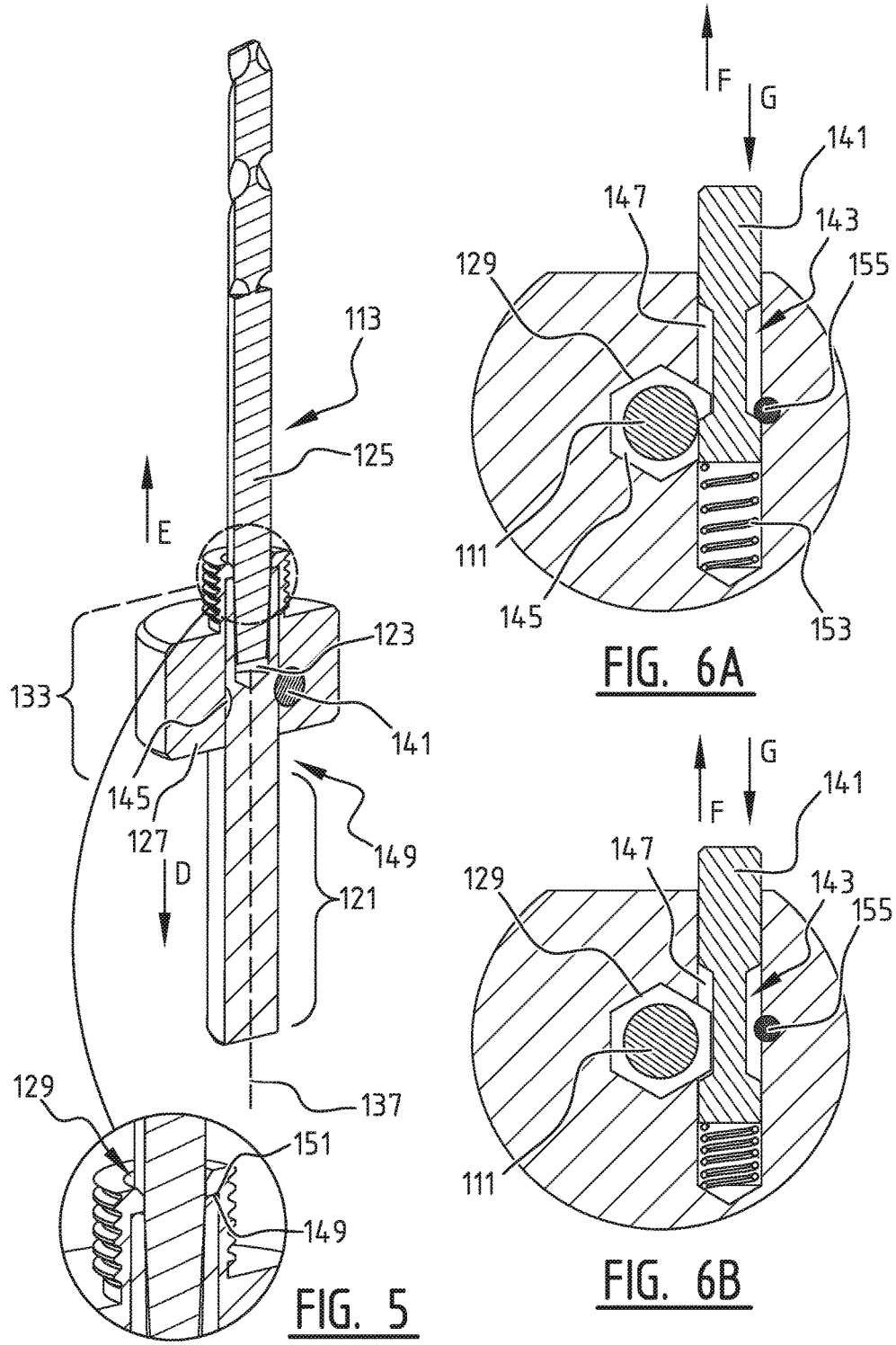

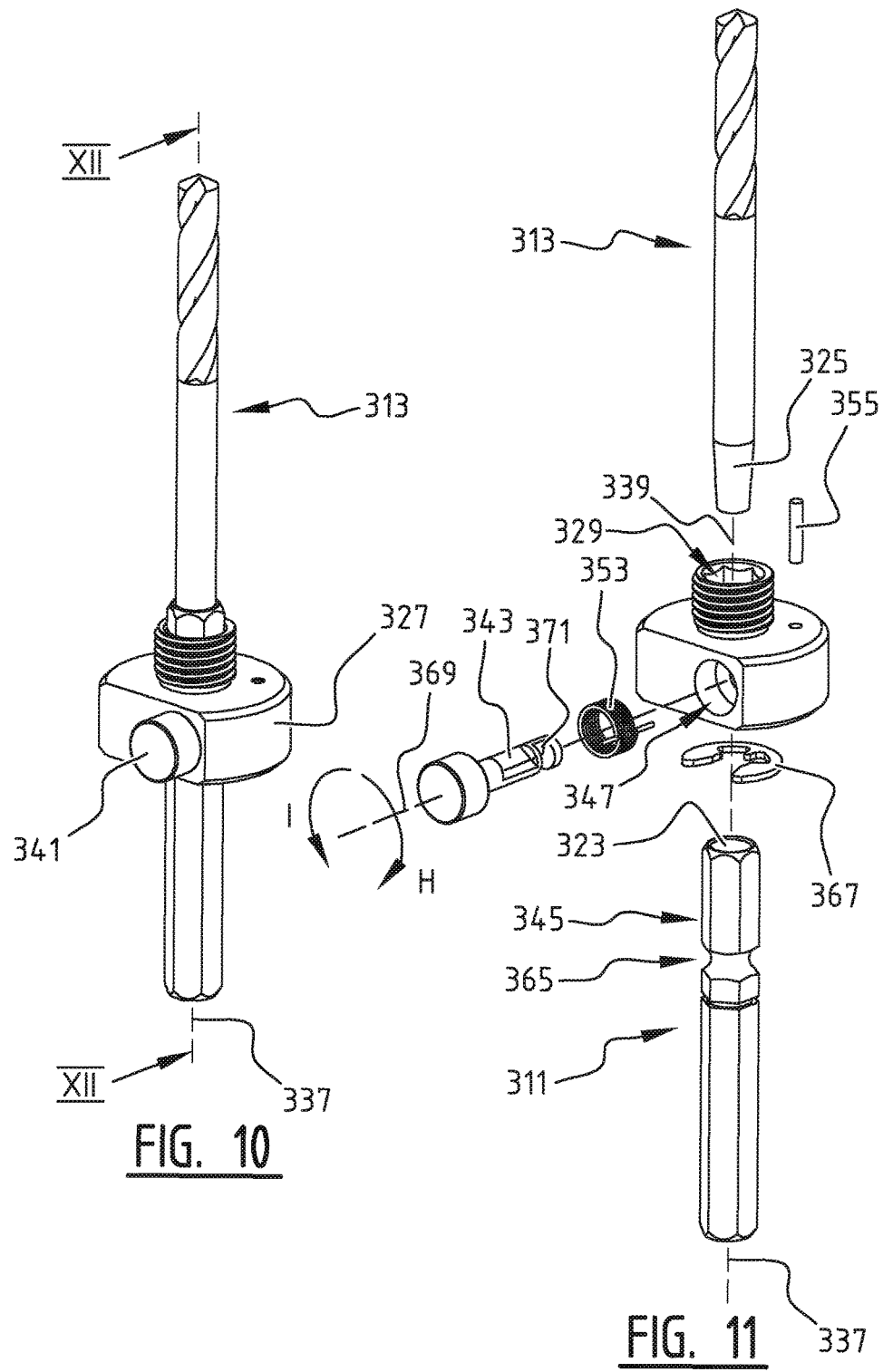

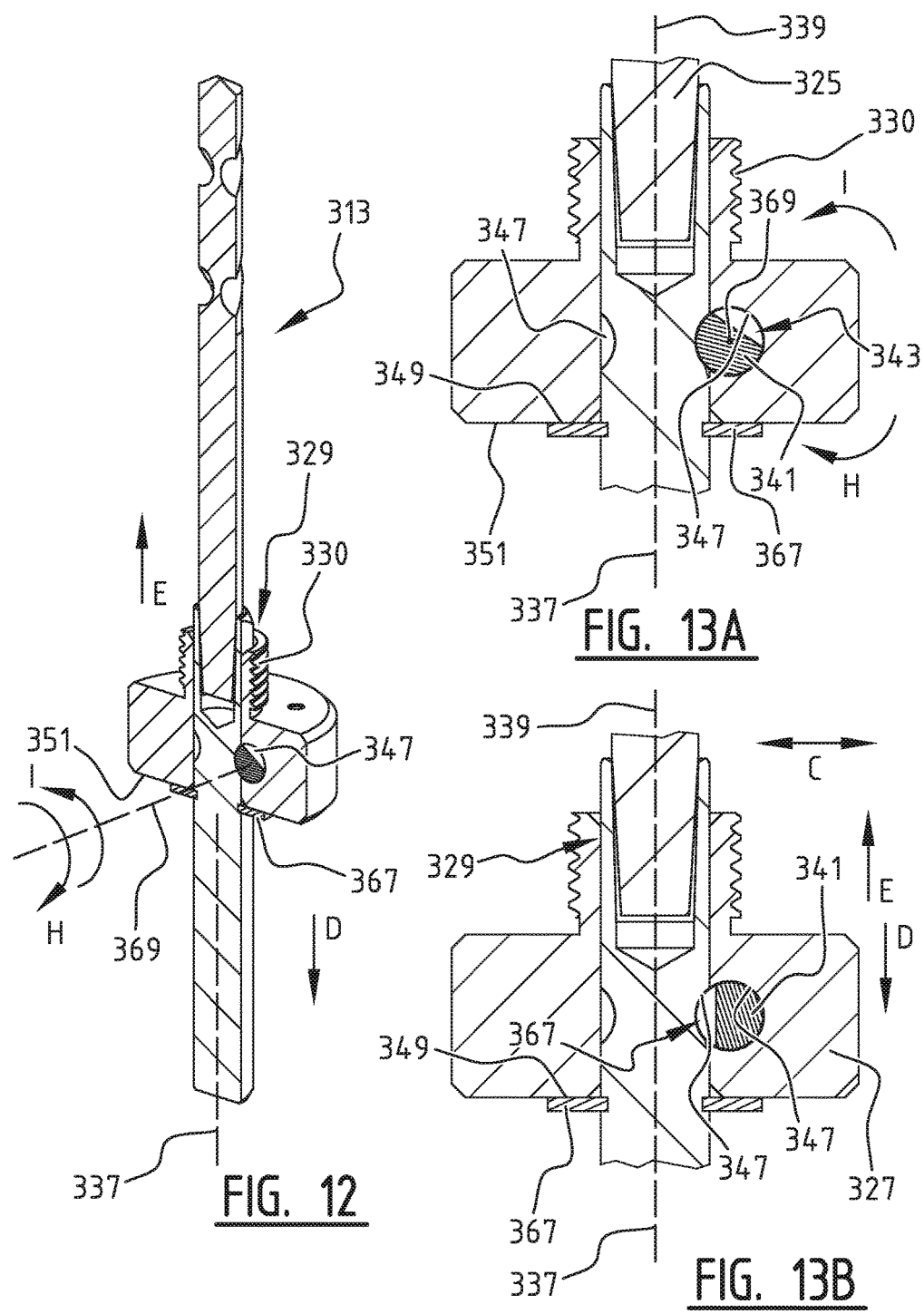

QUICK CHANGE SYSTEM FOR ROTARY TOOLS

The present invention relates to a quick change system for rotary tools, particularly hole saws.

Quick change systems for hole saws are known. The known quick change systems have complex and voluminous operating mechanisms, require a complex manufacture of the different components of the system, and are thereby expensive.

The present invention has for its object, among others, to reduce these and other drawbacks of known quick change systems.

The quick change system according to the invention comprises a tool holder for holding a rotary tool, the tool holder comprising:
 an elongate shank; and
 a tool adapter for coupling a rotary tool to the shank;
wherein
 the shank is embodied at a first end as a connection which can be connected to a drill chuck of a drilling machine;
 the tool adapter comprises an adapter body with a shank receiving cavity therein;
 the shank and the shank receiving cavity have a cross-sectional shape such that the second end of the shank can be inserted into the shank receiving cavity in order to bring the shank into engagement with the adapter body; and wherein the tool holder also comprises:
 a rotation blocking arranged on at least one of the elongate shank and the tool adapter and configured to block a rotation of the tool adapter relative to the shank about the central longitudinal axis thereof once the tool adapter has been brought into engagement with the elongate shank;
 a first axial blocking which can be operated between a blocking mode and a release mode, wherein, once the tool adapter has been brought into engagement with the elongate shank:
  in the blocking mode the translation of the tool adapter relative to the elongate shank along the central longitudinal axis is blocked in the direction from the first end to the second end thereof; and
  in the release mode the translation of the tool adapter relative to the elongate shank along the central longitudinal axis is free in the direction from the first end to the second end thereof;
wherein the tool holder also comprises:
 a second axial blocking which cannot be operated and which is configured to block a translation of the tool adapter relative to the elongate shank along the central longitudinal axis in the direction from the second end to the first end thereof and to allow a translation of the tool adapter relative to the elongate shank along the central longitudinal axis in the direction from the first end to the second end thereof;
wherein
 the second axial blocking is positioned such that, when the tool adapter is brought into engagement with the elongate shank in the blocking mode of the first axial blocking, the second axial blocking blocks the translation of the tool adapter relative to the elongate shank along the central longitudinal axis in the direction of the first end thereof.

These measures make possible a quick change system with components of exceptionally simple design which are easy to manufacture and assemble. The application of a shank which can be inserted into a shank receiving cavity in the tool adapter in order to bring the tool adapter into engagement with the shank and thus couple a rotary tool to the shank makes possible a simple embodiment and manufacture of the shank, for instance from a rod-like piece of starting material. In the release mode the first axial blocking which can be operated makes it possible to remove a rotary tool and the tool adapter from the shank, for instance in order to exchange them for another rotary tool and tool adapter, and in the blocking mode prevents the tool adapter with rotary tool arranged thereon unintentionally detaching from the shank, for instance when the rotary tool is directed toward the ground during work operations. The second axial blocking which cannot be operated and which is operative simultaneously with the first axial blocking and is not displaceable between a blocking position and a release position by means of an operating element, blocks the displacement of the tool adapter in the direction of the drilling machine resulting from the forces exerted on the rotary tool and the tool adapter by the material being machine drilled while operations are being performed with the rotary tool in reaction to the pushing force in the direction of this material which the user exerts on the rotary tool and the tool adapter via the drilling machine. The forces causing the rotary tool to detach from the shank, i.e. causing the rotary tool and tool adapter to be displaced away from the drilling machine, are low compared to the forces causing the rotary tool and the tool adapter to be displaced toward the drilling machine. This is particularly the case with a hole saw as rotary tool. Through the use of the second axial blocking the first axial blocking need only be able to withstand small forces and can thereby be of simple design with a simple operating mechanism. Because of the use of the first axial blocking which can be operated it is not necessary to operate the second axial blocking, and it can thus be optimally configured to withstand the relatively great axial forces, this allowing a relatively simple embodiment of the second axial blocking.

Because the shank is embodied at the first end thereof as a connection which can be connected to a drill chuck of a drilling machine, the connection of the tool holder to the drilling machine is independent of the embodiment of the rotation blocking, first axial blocking and second axial blocking which form part of the tool holder. The first end of the shank can thus be embodied as a connection which co-acts with standard drill chucks. This has the advantage that the tool holder of the quick change system according to the invention can be applied in combination with standard drill chucks of drilling machines and the drilling machine need not be provided with a drill chuck specially embodied for the tool holder. Known standard embodiments of shanks for connection to drill chucks are: the SDS shank, the HEX shank, the triangle shank and the straight shank.

Although the quick change system according to the invention is particularly suitable for quick change of hole saws, the quick change system according to the invention is also favourable for quick change of other rotary tools, such as core drills, brushes, sanding discs, polishing discs and so on.

Because the first axial blocking which can be operated can be embodied in relatively simple manner through the use of the second axial blocking, displaceable elements of the operating mechanism can be of simple design and can thereby be integrated into the tool adapter in cost-effective manner. in a particularly favourable embodiment those displaceable elements with which the first axial blocking can be operated between the blocking mode and the release mode are arranged on the tool adapter. The shank can hereby remain clear of displaceable operating elements and can thereby be of particularly simple design. Use is made hereof in a preferred embodiment of the quick change system according to the invention. In this embodiment the first axial blocking comprises:

- a blocking pin arranged on the adapter body and having a recess between the ends thereof; and
- a blocking groove arranged on the shank;

wherein

- the blocking pin extends in a blocking pin cavity extending transversely relative to the central longitudinal axis of the shank receiving cavity and offset relative to the central longitudinal axis of the shank receiving cavity, the blocking pin cavity partially intersecting the shank receiving cavity;
- the blocking pin is displaceable in the blocking pin cavity between a blocking position and a release position, wherein:
  - in the blocking position the recess is positioned such that the blocking pin extends partially in the shank receiving cavity; and
  - in the release position the recess is positioned such that the shank receiving cavity lies clear of the blocking pin;

and

- the blocking groove and the blocking pin are arranged such that, when the shank is brought into engagement with the adapter body, the blocking groove can be positioned relative to the blocking pin such that in the blocking position of the blocking pin the part of the blocking pin extending in the shank receiving cavity also extends in the blocking groove.

In this embodiment only a blocking groove need be arranged in the shank in order to form the first axial blocking, which makes manufacture of the shank simple. The manufacture of the tool adapter is also simple due to the application of a blocking pin which is displaceable in a cavity. The blocking pin extends in the blocking groove along only a small portion of the blocking groove and on only one side of the shank. Since the first axial blocking need only withstand small forces, this is not a problem. Alternatively, the blocking pin does not protrude directly into the blocking groove but indirectly via a blocking element which protrudes in the blocking position into the blocking groove and which can be pulled or pressed out of the groove in the release position. The pin is preferably forced in the direction of the blocking position by means of a spring member. Although a blocking pin in combination with a blocking groove is particularly recommended, among other reasons because of the simplicity thereof, a differently embodied controllable blocking element could fulfil the blocking function of the blocking pin, for instance a plate-like blocking element, wherein one end is then for instance embodied as spring.

In a favourable embodiment hereof the blocking pin is at least one of:

- rotatable about the central longitudinal axis of the blocking pin; and
- translatable along the central longitudinal axis of the blocking pin;
- between the blocking position and the release position.

These measures make it possible to avoid forces exerted on the blocking pin during drilling from displacing the blocking pin out of the blocking position to the release position.

In a further favourable embodiment of the quick change system according to the invention the second axial blocking comprises at least one of:

- a radial size increase of the shank relative to the central longitudinal axis of the shank; and
- a radial size decrease of the shank receiving cavity relative to the central longitudinal axis of the shank receiving cavity, so that
- a number of, i.e. one or more, blocking surfaces of the shank which extend at least in radial direction relative to the central longitudinal axis of the shank can be brought into engagement with a number of, i.e. one or more, blocking surfaces of the tool adapter which extend at least in radial direction relative to the central longitudinal axis of the shank receiving cavity.

These measures enable an exceptionally simple and effective embodiment of the second axial blocking and exceptionally simple manufacture thereof. Such a blocking surface is also referred to as a stop surface or a butt surface. The radial increase in the size of the shank and the radial decrease in the size of the shank receiving cavity can be realized by means of radially protruding elements which are arranged respectively on the shank or in the shank receiving cavity or which are integrated.

In a favourable embodiment hereof the blocking surfaces of the shank and the blocking surfaces of the tool adapter to be brought into engagement therewith are at multiple positions along the cross-sectional periphery of the shank.

These measures enable a particularly effective axial blocking.

In a further favourable embodiment of the quick change system according to the invention the rotation blocking comprises a rotation blocking part of the shank and a rotation blocking part of the shank receiving cavity, wherein:

- the rotation blocking part of the shank can be brought into engagement with the rotation blocking part of the shank receiving cavity;
- the rotation blocking part of the shank has a shape varying from circular in cross-section of the shank; and
- the rotation blocking part of the shank receiving cavity has a cross-sectional shape varying from circular.

These measures enable a particularly simple and effective embodiment of the rotation blocking and particularly simple manufacture thereof.

In a favourable embodiment hereof the rotation blocking part of the shank and the rotation blocking part of the shank receiving cavity have substantially the same cross-sectional shape. In a favourable embodiment hereof the dimensions of the rotation blocking part of the shank and the rotation blocking part of the shank receiving cavity are such that the rotation blocking part of the shank and the rotation blocking part of the shank receiving cavity can be brought into mutual engagement along substantially the whole cross-sectional periphery. This measure makes a particularly effective rotation blocking possible.

In a further favourable embodiment of the quick change system according to the invention the shank receiving cavity is a continuous hole.

This measure makes it possible for a pilot drill to be arranged on the second end of the shank. This measure additionally makes it possible for the shank to protrude through the tool adapter, this contributing toward the stability of the tool adapter. It is also possible to place on the part of the shank protruding through the tool adapter a second tool adapter which is provided with a shank receiving cavity in which, similarly to the shank receiving cavity of the first adapter, the second end of the shank can be received.

In a favourable embodiment hereof the shank is provided at the second end thereof with a pilot drill receiving cavity for receiving a pilot drill. This measure makes it possible to arrange a pilot drill on the shank.

The present invention also relates to a quick change system according to the invention as described above, wherein a pilot drill is received in the pilot drill receiving cavity.

In a further favourable embodiment of the quick change system according to the invention, wherein the shank receiving cavity is a continuous hole, the rotation tool is a hole saw and the section and length of the shank receiving cavity and of the shank, in a part of the shank extending from the first end of the shank in the direction of the second end, are embodied such that the first end of the shank can be placed through the shank receiving cavity in order to press a core plug out of the hole saw using the first end of the shank. This measure makes it possible, after drilling a hole with a hole saw, to take the first end of the shank out of the drill chuck of the drilling machine, to take the second end of the shank out of the shank receiving cavity and to insert the first end of the shank through the shank receiving cavity in order to thus press a core plug out of the hole saw using the first end of the shank.

The present invention also relates to a quick change system according to the invention as described above, wherein a hole saw is arranged on the tool adapter.

The present invention also relates to a quick change system according to the invention as described above, comprising a plurality of tool adapters with a hole saw on each of the tool adapters.

The present invention also relates to a shank for forming a quick change system according to the invention as described above.

The present invention also relates to a tool adapter for forming a quick change system according to the invention as described above.

The present invention also relates to a method for manufacturing a quick change system according to the invention as described above.

The present invention will be further elucidated hereinbelow on the basis of a number of exemplary embodiments of the quick change system according to the invention as shown schematically in the accompanying drawing. These are non-limitative exemplary embodiments.

In the figures:

FIG. 3 is a perspective view of an embodiment of the quick change system according to the invention;

FIG. 4 shows the quick change system of FIG. 3 with exploded parts;

FIG. 5 shows the quick change system of FIG. 3 in longitudinal section;

FIGS. 6A and 6B show the quick change system of FIG. 3 in cross-section through the adapter body in respectively a blocking mode and a release mode;

FIG. 10 is a perspective view of a further alternative embodiment of the quick change system of FIG. 3;

FIG. 11 is a perspective view of the quick change system of FIG. 10 with exploded parts;

FIG. 12 is a perspective view in longitudinal section of the quick change system of FIG. 10;

FIGS. 13A and 13B show a detail of the longitudinal section of FIG. 12 close to the adapter body in blocked mode and release mode.

Figure 1:
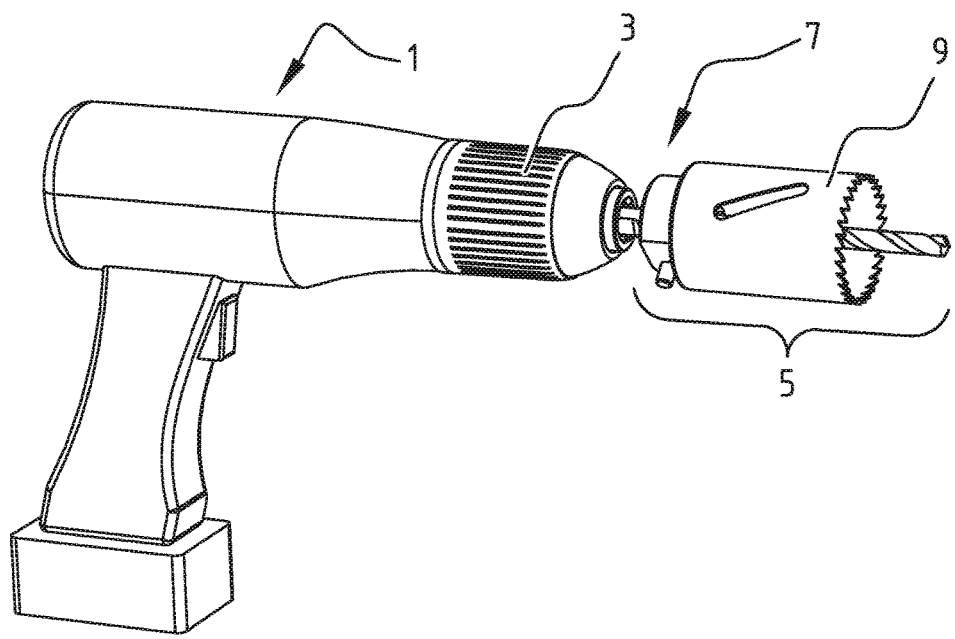
FIG. 1 is a perspective view of a drilling machine provided with a quick change system for a hole saw according to the invention.

FIG. 1 shows a drilling machine 1 with a drill chuck 3. Drilling machine 1 is provided with a quick change system 5 comprising a tool holder which is embodied as hole saw holder 7 and with which a rotary tool embodied as hole saw 9 is arranged on drilling machine 1.

Figure 2:
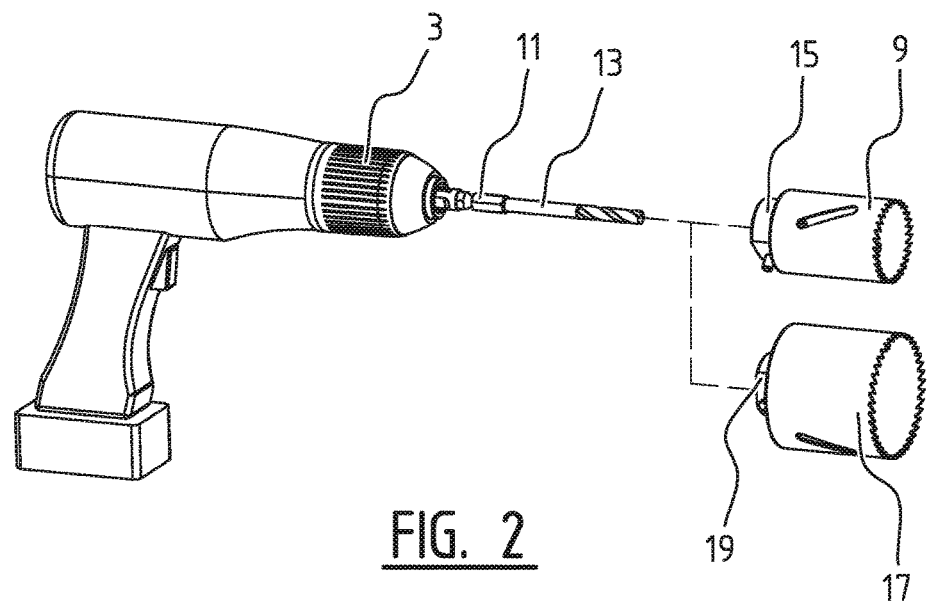
FIG. 2 is a perspective view of the drilling machine provided with the quick change system of FIG. 1 with exploded parts.

FIG. 2 shows that hole saw holder 7 of quick change system 5 comprises a shank 11 which is clamped with a first end thereof in drill chuck 3 and which is provided on a second end thereof with a pilot drill 13. Also shown is that hole saw holder 7 of FIG. 1 also comprises a hole saw adapter 15 which can couple the hole saw 9 as shown in FIG. 1 to shank 11. Hole saw adapter 15 is releasable from shank 11 as shown in FIG. 2 so as to enable coupling to shank 11 of another hole saw 17 arranged on another hole saw adapter 19, for instance a hole saw of a different diameter. Hole saw 9 of FIG. 1 can thus be exchanged with the other hole saw 17 without taking shank 11 with pilot drill 13 out of drill chuck 2.

FIGS. 3-6 show in detail a first embodiment of the quick change system according to the invention as shown in FIG. 1.

FIGS. 3, 4 and 5 show that a part of the elongate shank 111 of hole saw holder 107 is embodied at a first end as connection 121 which can be connected to a drill chuck of a drilling machine as shown in FIG. 1. In the shown exemplary embodiment the connection 121 is of the so-called hexagonal type, wherein the peripheral cross-sectional form is a hexagon. Shank 111 is provided at the second end with a pilot drill receiving cavity 123 into which the conically shaped connection 125 of pilot drill 113 can be pressed in order to arrange pilot drill 113 on shank 111. The pilot drill can also be received by means of for instance a collet chuck or tightening screw. Hole saw adapter 115 comprises an adapter body 127 with a shank receiving cavity 129 therein. Hole saw adapter 115 is provided on one side with connecting members in the form of a screw thread 130 onto which a hole saw can be screwed. A hole saw and a hole saw adapter can alternatively be integrated to form one whole.

Shank 111 and the shank receiving cavity 129 have a cross-sectional embodiment, i.e. have a shape and dimensions, such that the second end of shank 111 can be placed into shank receiving cavity 129 in order to bring shank 111 into engagement with adapter body 127. In the shown exemplary embodiment a rotation blocking part 131 of shank 111, which extends from the second end of shank 111 in the direction of the first end of shank 111, is embodied with a cross-sectional periphery in the form of a hexagon. Shank receiving cavity 129 is embodied as a continuous hole having in the shown exemplary embodiment an inner cross-sectional periphery in the form of hexagon along a portion of the length thereof, thus forming a rotation blocking part 133. Rotation blocking part 131 of shank 111 and rotation blocking part 133 of shank receiving cavity 129 have the same peripheral shape in cross-section and have dimensions such that the second end of shank 111 can be inserted into shank receiving cavity 129 in the longitudinal direction A of shank 111 and shank receiving cavity 129 in order to bring shank 111 into engagement with hole saw adapter 115. These dimensions are also such that rotation blocking part 131 of shank 111 and rotation blocking part 133 of shank receiving cavity 129 can be brought into mutual engagement along substantially the whole cross-sectional periphery. Because of the shape varying from circular the rotation blocking part 131 of shank 111 and rotation blocking part 133 of the shank receiving cavity 129 are, when shank 111 and hole saw adapter 115 are in mutual engagement, displaceable relative to each other in the longitudinal direction A of shank 111 and shank receiving cavity 129, but not rotatable relative to each other in the direction of arrows B around the central longitudinal axis 137 of shank 111 and the central longitudinal axis 139 of shank receiving cavity 129, which coincide when shank 111 and hole saw adapter 115 are in mutual engagement. Rotation blocking part 131 of shank 111 and rotation blocking part 133 of shank receiving cavity 129 hereby together form a rotation blocking. Other shapes varying from circular are otherwise also possible, such as oval or a polygon other than a hexagon.

FIGS. 3, 4 and 5 also show that on shank 111 and on adapter body 127 is arranged a first axial blocking in the form of a blocking pin 141 arranged on adapter body 127 and having between the ends thereof a recess in the form of a narrowed portion 143, and a blocking groove 145 arranged on the shank.

Blocking pin 143 extends in a blocking pin cavity 147 extending transversely relative to the central longitudinal axis 139 of shank receiving cavity 129 and offset relative to the central longitudinal axis 139 of shank receiving cavity 129.

Blocking groove 145 extends around the periphery of shank 111.

As shown in FIG. 5, shank receiving cavity 129 is provided at an end with a radial cross-sectional size decrease of shank receiving cavity 129. This radial size decrease forms a blocking surface 151 on hole saw adapter 115 which extends in radial direction C and which, after insertion of the second end of shank 111 into shank receiving cavity 129, comes into contact with a radially extending blocking surface 149 at the second end of shank 111, so that a further displacement of hole saw adapter 115 along the central longitudinal axis 137 of shank 111 in the direction D from the second end to the first end of shank 111 is blocked. As shown in FIG. 5, blocking surfaces 149 and 151 are in mutual contact in the blocking mode of the first axial blocking formed by means of blocking pin 141 which extends partially in blocking groove 145. A second axial blocking is formed in that the two blocking surfaces 149, 151 come into mutual contact and extend in radial direction C. When shank 111 is in engagement with hole saw adapter 115 as shown in FIG. 5, this second axial blocking blocks a displacement of hole saw adapter 115 along shank 111 in the direction D from the second end to the first end thereof, but allows a displacement in the direction E from the first end to the second end of shank 111.

Because blocking pin 141 extends partially in blocking groove 145 in a blocking mode of the first axial blocking as shown in FIG. 5, the first axial blocking formed by means of blocking pin 141 and blocking groove 145 blocks a displacement of hole saw adapter 115 along shank 111 in the direction E from the first end to the second end of shank 111.

As shown, in this embodiment the second end of shank 111 protrudes out of shank receiving cavity 129.

Shown particularly in FIG. 6A is that blocking pin cavity 147 extends transversely relative to the central longitudinal axis 139 of shank receiving cavity 129 and offset relative to the central longitudinal axis 139 of shank receiving cavity 129 so that blocking pin cavity 147 partially intersects shank receiving cavity 129. Blocking pin 141 is displaceable in blocking pin cavity 147 in the direction of arrows F and G. Blocking pin cavity 147 is formed as a blind hole. Blocking pin 141 is pressed in the direction of arrow F by means of a helical spring 153, in particular a compression spring. Blocking pin 141 is retained here by means of a grooved pin 155 extending partially in narrowed portion 143 of blocking pin 141 so that blocking pin 141 cannot displace further in the direction of arrow F in blocking pin cavity 147 from the position thereof shown in FIG. 6A. FIG. 3A shows blocking pin 141 in the blocking position, wherein narrowed portion 143 is positioned such that blocking pin 141 extends partially in shank receiving cavity 129. As shown in FIGS. 5 and 6A, blocking pin 141 also extends in blocking groove 145 so that the first axial blocking is in the blocking mode. Because blocking pin 141 extends in this mode in blocking groove 145, a displacement of hole saw adapter 115 relative to shank 111 along the longitudinal axis 137 of shank 111 in the direction E from the first end to the second end of shank 111 is blocked in this position. FIG. 5 also shows that blocking groove 145 is positioned such that blocking surfaces 149, 151 are in mutual contact in the blocking mode of the first axial blocking so that the second axial blocking blocks a displacement of hole saw adapter 115 relative to shank 111 along the longitudinal axis 137 of shank 111 in the direction from the second end to the first end of shank 111.

Although blocking pin 141 cannot be displaced in the direction of arrow F from its position as shown in FIG. 6A, a displacement in the direction of arrow G is however possible by pressing blocking pin 141 in the direction of arrow G counter to the force exerted by the helical spring. Blocking pin 141 can hereby be moved from the blocking position into the release position shown in FIG. 6B. In the release position the recess is positioned such that shank receiving cavity 129 lies clear of blocking pin 141. With blocking pin 141 in the release position the hole saw adapter 115 is displaceable relative to shank 111 in the direction E from the first end to the second end of shank 111, and is thus removable from shank 111. The first axial blocking formed by blocking pin 141 and blocking groove 145 is then in the release mode. The first axial blocking can be operated between the blocking mode and the release mode. In the release mode a displacement of hole saw adapter 115 in the direction D from the second end to the first end of shank 111 is not possible since this displacement is blocked by the second blocking. The second blocking cannot be operated.

The embodiment shown in FIGS. 3-6 is exceptionally easy to manufacture. The shank is particularly easy to form with simple operations from a rod-like piece of starting material having a hexagonal periphery in cross-section.

Figures 7, 8:
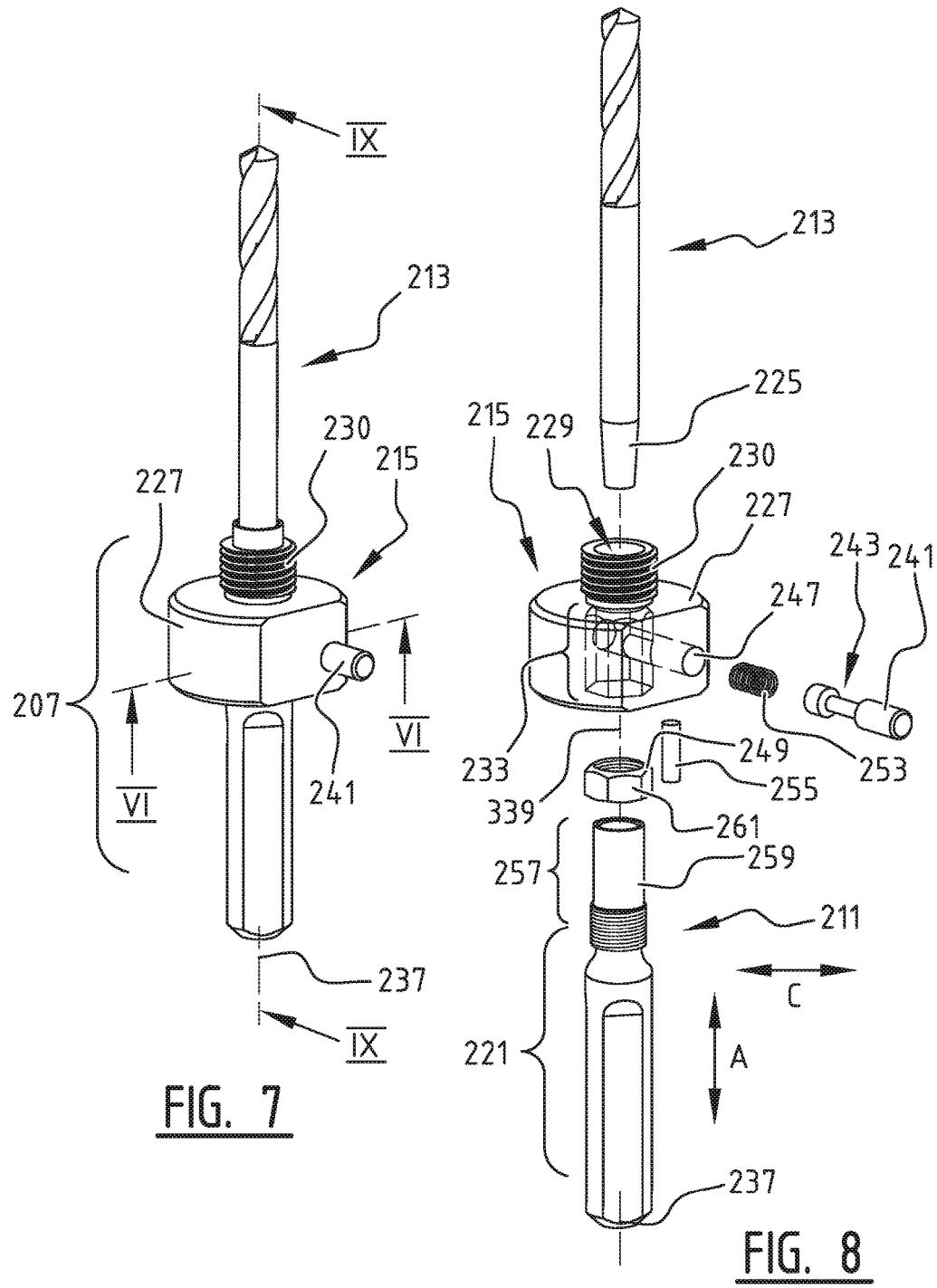
FIG. 7 is a perspective view of an alternative embodiment of the quick change system of FIG. 3.
FIG. 8 is a perspective view with exploded parts of the quick change system of FIG. 7.
Figure 9:
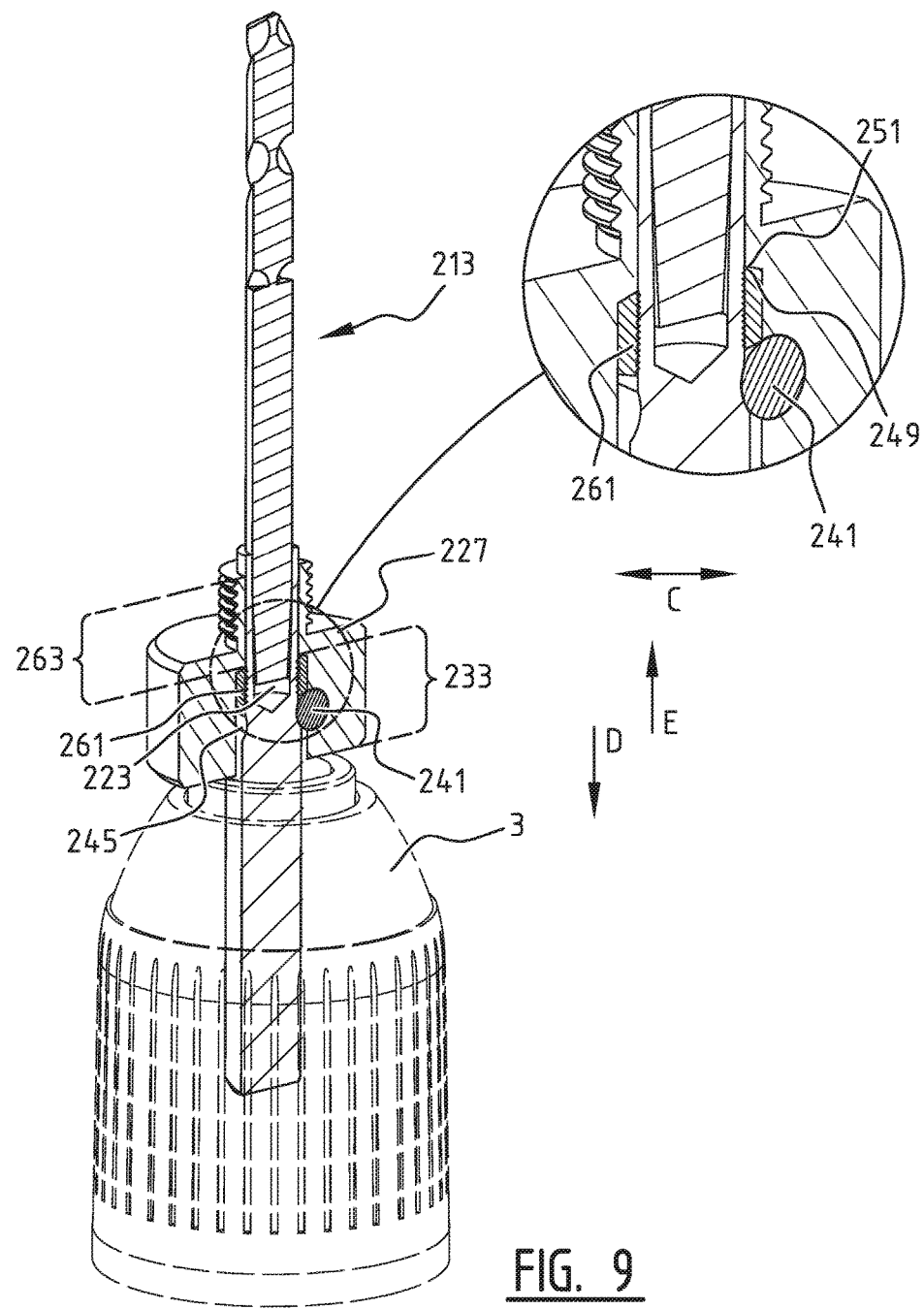
FIG. 9 shows the quick change system of FIG. 7 in longitudinal section and placed in a drill chuck of the drilling machine of FIG. 1.

FIGS. 7-9 show a second embodiment of the quick change system according to the invention as shown in detail in FIG. 1. This second embodiment corresponds for the greater part to the embodiment as shown in FIGS. 3-6, so that in terms of description it suffices to note that components of the embodiment as shown in FIGS. 7-9 which are the same as components of the embodiment shown in FIGS. 3-6 have the same reference numerals, albeit that the first digit of each number is a 2 instead of a 1. There are however differences between the two embodiments which will be described hereinbelow.

The embodiment of the quick change system as shown in FIGS. 7-9 differs from the embodiment as shown in FIGS. 3-6 in that the shank 211, the second axial blocking and the rotation blocking take different forms.

FIGS. 7-9 show that the elongate shank 211 of hole saw holder 207 has at a first end a first end part embodied as connection 221 of the type with three clamping surfaces, wherein the cross-sectional peripheral shape is a circular shape flattened at three positions. At the second end shank 211 is provided with a second end part 257 of circular cross-section which is partially provided with screw thread 259 onto which can be screwed a nut 261 with a hexagonal cross-sectional peripheral shape. After nut 261 has been screwed onto screw thread 259, the end of the first end part 221 remote from the first end of shank 211 forms together with the side of nut 261 facing toward the first end of shank 211 the blocking groove 245, which together with blocking pin 241 forms the first axial blocking. Alternatively applied is a thicker nut in which blocking groove 245 is arranged. Screw thread 259 has a direction such that, when a hole is being drilled in a surface by means of a hole saw, nut 261 is forced in the direction of the first end of shank 211 and comes to a stop at the end of screw thread 259 facing toward the first end of the shank. Nut 261 can optionally be additionally locked on shank 211 by means of a locking material between screw thread 259 and the screw thread of nut 261.

Hole saw adapter 215 comprises an adapter body 227 with a shank receiving cavity 229 therein. Shank receiving cavity 229 is formed as a continuous hole with a rotation blocking part 233 having in cross-section an inner periphery in the form of a hexagon and a part 263 having in cross-section a circular inner periphery. Rotation blocking part 233 can be brought into engagement with the hexagonal outer periphery of nut 261 in order to together form the rotation blocking which blocks rotation in one rotation direction. Nut 261 forms here the rotation blocking part 231 of shank 211. The part 263 of shank receiving cavity 229 having a circular inner periphery in cross-section forms a radial size decrease in shank receiving cavity 229 at the position of the transition of rotation blocking part 233 of shank receiving cavity 229 and the part 263 having a circular inner periphery in cross-section. This radial size decrease forms a blocking surface 251 on hole saw adapter 215 which extends in axial direction E, D and radial direction C and which, once the second end of shank 211 has been inserted into shank receiving cavity 229, comes into contact with the radially extending surface 249 of the nut facing toward the second end of shank 211 and forming a blocking surface, so that a further displacement of hole saw adapter 215 along the central longitudinal axis 237 of shank 211 in the direction D from the second end to the first end of shank 211 is blocked. As shown in FIG. 9, blocking surfaces 249 and 251 are in mutual contact in the blocking mode of the first axial blocking formed by the blocking pin 241 which extends partially in blocking groove 245.

The embodiment shown in FIGS. 7-9 is particularly easy to manufacture. The shank in particular is easy to form with simple operations from a rod-like starting material having a circular periphery in cross-section.

FIGS. 10-13 show a third embodiment of the quick change system according to the invention as shown in detail in FIG. 1. This third embodiment also corresponds for the greater part to the embodiment as shown in FIGS. 3-6, so that in terms of description it suffices to note that components of the embodiment as shown in FIGS. 10-13 which are the same as components of the embodiment shown in FIGS. 3-6 have the same reference numerals, albeit that the first digit of each number is a 3 instead of a 1. There are however differences between the two embodiments which will be described hereinbelow.

The embodiment of the quick change system as shown in FIG. 10-13 differs from the embodiment as shown in FIGS. 3-6 in that the first axial blocking and the second axial blocking take different forms.

FIGS. 10-13 show that elongate shank 311 of hole saw holder 307 is formed from an elongate rod, the cross-sectional peripheral shape of which is a hexagon. Two grooves are arranged in shank 311, a blocking groove 345 in which a blocking pin 341 partially extends in the blocking mode of the first axial blocking as shown in FIGS. 12 and 13A, and a mounting groove 365. Mounting groove 365 is arranged between the first end of shank 311 and blocking groove 345 and serves to mount a blocking clip 367. Arranged on shank 311, blocking clip 367 forms a radial size increase in shank 311, relative to the central longitudinal axis of shank 311, and a blocking surface 349 extending in radial direction C. FIGS. 12 and 13 show that, when shank 311 is brought into engagement with hole saw adapter 315 by inserting the second end thereof into shank receiving cavity 329, blocking surface 349 on shank 311 comes into contact with the surface 351 which also extends in radial direction C and faces toward the first end of shank 311, and which then also forms a blocking surface. Because the two blocking surfaces 349, 351 come into mutual contact and extend in radial direction C, a second axial blocking is formed. When shank 311 is in engagement with hole saw adapter 315 as shown in FIGS. 12 and 13, this second axial blocking blocks a displacement of hole saw adapter 315 along shank 311 in the direction D from the second end to the first end thereof, but allows a displacement in direction E from the first end to the second end of shank 311.

As in the embodiment of FIGS. 3-6, a blocking pin cavity 347 extends transversely relative to the central longitudinal axis 339 of shank receiving cavity 329 and offset relative to the central longitudinal axis 339 of shank receiving cavity 329, so that blocking pin cavity 347 partially intersects shank receiving cavity 329, and a blocking pin 341 extends in blocking pin cavity 347. Blocking pin 341 is however received not for translation but for rotation in blocking pin cavity 347 about the central longitudinal axis 369 of blocking pin 341 in the direction of arrows H and I. Blocking pin 341 is provided with a blocking recess 343 and a mounting recess 371. In the mounted situation grooved pin 345 extends in mounting recess 371 in order to avoid blocking pin 341 exiting from blocking pin cavity 347.

FIG. 13A shows blocking pin 341 in the blocking position, wherein blocking recess 343 is positioned such that blocking pin 341 extends partially in shank receiving cavity 329. As shown in FIGS. 12 and 13A, blocking pin 341 also extends in blocking groove 345 so that the first axial blocking is in the blocking mode. Blocking pin 341 is pressed in the direction of arrow H by means of a torsion spring 353, wherein further rotation in the direction of arrow H from the situation shown in FIG. 13A is blocked by grooved pin 345. Because blocking pin 341 extends in this situation in blocking groove 345, a displacement of hole saw adapter 315 relative to shank 311 along longitudinal axis 337 of shank 311 in the direction E from the first end to the second end of shank 311 is blocked in this situation. FIGS. 12 and 13 also show that blocking groove 345 is positioned such that blocking surfaces 349, 351 are in mutual contact in the blocking mode of the first axial blocking, so that the second axial blocking blocks a displacement of hole saw adapter 315 relative to shank 311 along the longitudinal axis 337 of shank 311 in the direction D from the second end to the first end of shank 311.

As shown, the second end of shank 311 protrudes in this embodiment from shank receiving cavity 329.

Although blocking pin 341 cannot be rotated in the direction of arrow H from its position as shown in FIG. 13A, a rotation in the direction of arrow I is however possible by rotating the blocking pin 341 in the direction of arrow I counter to the force exerted by torsion spring 353. Blocking pin 341 can hereby be moved from the blocking position to the release position shown in FIG. 13B. In the release position blocking recess 343 is positioned such that shank receiving cavity 329 lies clear of blocking pin 341. With blocking pin 341 in the release position the hole saw adapter 315 is displaceable relative to shank 311 in the direction E from the first end to the second end of shank 311, and can thus be removed from shank 311. The first axial blocking formed by blocking pin 341 and blocking groove 345 is then in the release mode. The first axial blocking can be operated between the blocking mode and the release mode. In the release mode a displacement of hole saw adapter 315 in the direction D from the second end to the first end of shank 311 is not possible, since this displacement is blocked by the second blocking. The second blocking cannot be operated.

The embodiment shown in FIGS. 10-13 is exceptionally easy to manufacture. The shank in particular is easy to form with simple operations from a rod-like piece of starting material having a hexagonal periphery in cross-section. All that is required is to form two grooves, to form a cavity at the second end and to place a blocking clip in one of the grooves.

In the embodiment shown in FIGS. 10-13 it is possible to place the first end of shank 311 through shank receiving cavity 329 once the second end of the shank, in which pilot drill 313 is arranged, has been taken out of shank receiving cavity 329. If the part of shank 311 between the first end and blocking clip 367 is sufficiently long, it is thus possible using the first end of shank 311 to press a core plug out of a hole saw arranged on screw thread 330 once the core plug has been sawn out of a workpiece. It is then of course first necessary to remove the first end of shank 311 from the drill head in which the first end was clamped while the core plug was being sawn out.

It is the case for each of the shown embodiments that the first axial blocking formed by a blocking pin and a blocking groove forms an axial blocking which can be operated and which is embodied and realizable in exceptionally simple manner, wherein the blocking pin extends in the blocking mode in the blocking groove at only a single location around the cross-sectional periphery of the shank. The blocking surfaces of the second axial blocking are in mutual contact at multiple locations around the periphery of the shank. Such an axial blocking which acts at multiple locations round the periphery of the shank is particularly easy to realize because the second axial blocking cannot be operated.

The translatable blocking pin as shown in the embodiments of FIGS. 3-9 can be embodied just as the rotatable blocking pin as shown in the embodiments of FIG. 10-13, and vice versa. The different embodiments of the second axial blocking and the connecting part at the first end of the shank are mutually interchangeable.

In addition to the hexagonal shape, any shape varying from circular can serve as rotation blocking, including triangular, square, rectangular and so on. The cross-sectional dimensions of the rotation blocking part of the shank can be greater here than the cross-sectional dimensions of the part of the shank serving as connection for a drill chuck of a drilling machine. The shank can in this case also be manufactured from a rod-like piece of starting material.

In the shown exemplary embodiments different embodiments are shown of the connection of the shank, the first axial blocking, the second axial blocking and the rotation blocking. These different embodiments are mutually interchangeable.

The invention claimed is:

1. Quick change system comprising a tool holder for holding a rotary tool, the tool holder comprising:
    an elongated shank;
    a tool adapter for coupling the rotary tool to the elongated shank,
        the elongated shank including a first part at a first end of the elongated shank, connectable to a drill chuck of a drilling machine, and a second part at a second end of the elongated shank,
        the tool adapter comprising an adapter body with a shank receiving cavity therein to receive the second part of the elongated shank,
        the second part of the elongated shank and the shank receiving cavity including a cross-sectional shape such that the second part of the elongated shank at the second end of the elongated shank is insertable into the shank receiving cavity to bring the elongated shank into engagement with the adapter body;
    a rotation blocking, arranged on at least one of the second part of the elongated shank and the tool adapter, configured to block a rotation of the tool adapter relative to the elongated shank about the central longitudinal axis of the elongated shank once the tool adapter has been brought into engagement with the elongated shank;
    a first axial blocking, arranged on at least one of the second part of the elongated shank and the tool adapter, operateable in a blocking mode and in a release mode, wherein, once the tool adapter has been brought into engagement with the elongated shank:
        in the blocking mode, the translation of the tool adapter relative to the elongated shank along the central longitudinal axis is blocked in the direction from the first end to the second end of the elongated shank, and
        in the release mode, the translation of the tool adapter relative to the elongated shank along the central longitudinal axis is free in the direction from the first end to the second end of the elongated shank,
    wherein
        the tool adapter is integrated with the rotary tool to form one whole or is adapted to arrange the rotary tool thereon, such that in the release mode the rotary tool and the tool adapter are removable from the elongated shank by translating the tool adapter with the rotary tool arranged thereon relative to the elongated shank along the central longitudinal axis in the direction from the first end to the second end of the elongated shank; and
    a second axial blocking, not operable in a release mode and operable only in a blocking mode to block a translation of the tool adapter relative to the elongated shank along the central longitudinal axis in the direction from the second end to the first end of the elongated shank and to allow a translation of the tool adapter relative to the elongated shank along the central longitudinal axis in the direction from the first end to the second end of the elongated shank;
    wherein
        the second axial blocking is positioned such that, upon the tool adapter being brought into engagement with the elongated shank in the blocking mode of the first axial blocking, the second axial blocking is configured to block the translation of the tool adapter relative to the elongated shank along the central longitudinal axis in the direction of the first end of the elongated shank.

2. Quick change system of claim 1,
wherein the first axial blocking comprises:
a blocking pin arranged on the adapter body, including a recess between ends of the blocking pin; and
a blocking groove arranged on the second part of the elongated shank;
wherein
the blocking pin extends in a blocking pin cavity extending transversely relative to the central longitudinal axis of the shank receiving cavity and offset relative to the central longitudinal axis of the shank receiving cavity, the blocking pin cavity partially intersecting the shank receiving cavity;
the blocking pin is displaceable in the blocking pin cavity between a blocking position and a release position, wherein:
in the blocking position the recess is positioned such that the blocking pin extends partially in the shank receiving cavity; and
in the release position the recess is positioned such that the elongated shank receiving cavity lies clear of the blocking pin;
and
the blocking groove and the blocking pin are arranged such that, when the second part of the elongated shank is brought into engagement with the adapter body, the blocking groove is positionable relative to the blocking pin such that in the blocking position of the blocking pin the part of the blocking pin extending in the shank receiving cavity also extends in the blocking groove.

3. Quick change system of claim 2, wherein the blocking pin is at least one of:
rotatable about the central longitudinal axis of the blocking pin; and
translatable along the central longitudinal axis of the blocking pin, between the blocking position and the release position.

4. Quick change system of claim 1,
wherein the second axial blocking comprises at least one of:
a radial size increase of the elongated shank relative to the central longitudinal axis of the elongated shank; and
a radial size decrease of the shank receiving cavity relative to the central longitudinal axis of the shank receiving cavity,
so that
a number of blocking surfaces of the elongated shank, which extend at least in radial direction relative to the central longitudinal axis of the elongated shank, are able to be brought into engagement with a number of blocking surfaces of the tool adapter which extend at least in radial direction relative to the central longitudinal axis of the shank receiving cavity.

5. Quick change system of claim 4,
wherein
the blocking surfaces of the elongated shank and the blocking surfaces of the tool adapter, to be brought into engagement with the blocking surfaces of the elongated shank, are at multiple positions along the cross-sectional periphery of the elongated shank.

6. Quick change system of claim 1, wherein the rotation blocking comprises a rotation blocking part of the elongated shank and a rotation blocking part of the shank receiving cavity,
wherein:
the rotation blocking part of the elongated shank is able to be brought into engagement with the rotation blocking part of the elongated shank receiving cavity;
the rotation blocking part of the elongated shank has a shape varying from circular in cross-section of the elongated shank; and
the rotation blocking part of the shank receiving cavity has a cross-sectional shape varying from circular.

7. Quick change system of claim 1,
wherein
the rotation blocking part of the elongated shank and the rotation blocking part of the shank receiving cavity have substantially the same cross-sectional shape.

8. Quick change system of claim 7,
wherein
the dimensions of the rotation blocking part of the elongated shank and the rotation blocking part of the shank receiving cavity are such that the rotation blocking part of the elongated shank and the rotation blocking part of the shank receiving cavity are able to be brought into mutual engagement along substantially the whole cross-sectional periphery.

9. Quick change system of claim 1, wherein the shank receiving cavity is a continuous hole.

10. Quick change system of claim 9,
wherein
the second part of the elongated shank is provided at the second end of the elongated shank with a pilot drill receiving cavity for receiving a pilot drill.

11. Quick change system of claim 10,
wherein a pilot drill is received in the pilot drill receiving cavity.

12. Quick change system as claimed in claim 9,
wherein
the rotary tool is a hole saw, and
the section and length of the shank receiving cavity and of the elongated shank, in a part of the elongated shank extending from the first end of the elongated shank in the direction of the second end, are embodied such that, with the second end of the elongated shank taken out of the shank receiving cavity, the first end of the elongated shank is insertable in and placed through the shank receiving cavity in order to press a core plug out of the hole saw using the first end of the elongated shank.

13. Quick change system of claim 1, wherein a rotary tool is arranged on the tool adapter.

14. Quick change system of claim 13, wherein the rotary tool is a hole saw.

15. Quick change system of claim 1, comprising a plurality of tool adapters with a rotary tool on each of the tool adapters.

16. Quick change system of claim 15, wherein the rotary tool is a hole saw.

17. The elongated shank for forming the quick change system of claim 1.

18. Tool adapter for forming the quick change system of claim 1.

19. Quick change system of claim 1, wherein the rotary tool is a hole saw.

\* \* \* \* \*